United States Patent
Toyota et al.

(10) Patent No.: US 7,539,763 B2
(45) Date of Patent: May 26, 2009

(54) COMMUNITY-BASED COLLABORATIVE KNOWLEDGE SYSTEM, AND MESSAGE SUBSCRIPTION TYPE SETTING METHOD AND REPLY MESSAGE PROCESSING METHOD IN THAT SYSTEM

(75) Inventors: Mayo Toyota, Ome (JP); Hitoshi Tanigawa, Higashiyamato (JP); Masaaki Iwata, Ome (JP); Kazunori Shimakawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 289 days.

(21) Appl. No.: 10/083,151

(22) Filed: Feb. 27, 2002

(65) Prior Publication Data
US 2002/0174179 A1 Nov. 21, 2002

(30) Foreign Application Priority Data
May 15, 2001 (JP) .............................. 2001-145247

(51) Int. Cl.
*G06F 15/16* (2006.01)
*G06F 15/173* (2006.01)
*G06F 7/00* (2006.01)

(52) U.S. Cl. .................. 709/229; 709/203; 709/206; 709/223; 707/1; 707/3; 707/7

(58) Field of Classification Search .............. 707/3, 707/1, 7; 709/203, 206, 223
See application file for complete search history.

(56) References Cited

U.S. PATENT DOCUMENTS

| | | | |
|---|---|---|---|
| 5,796,393 A * | 8/1998 | MacNaughton et al. ..... 715/733 |
| 6,484,196 B1 * | 11/2002 | Maurille ..................... 709/206 |
| 6,519,571 B1 * | 2/2003 | Guheen et al. ................ 705/14 |
| 6,571,234 B1 * | 5/2003 | Knight et al. .................. 707/3 |
| 6,594,673 B1 * | 7/2003 | Smith et al. ............. 707/104.1 |
| 6,630,944 B1 * | 10/2003 | Kakuta et al. ............... 715/758 |
| 6,778,982 B1 * | 8/2004 | Knight et al. .................. 707/3 |
| 6,804,675 B1 * | 10/2004 | Knight et al. ................ 707/10 |
| 6,816,885 B1 * | 11/2004 | Raghunandan ............. 709/206 |

(Continued)

FOREIGN PATENT DOCUMENTS

JP 2000-029798 1/2000

(Continued)

OTHER PUBLICATIONS

Translation of JP 2000-187631, Katsuya Sakamaki, Jul. 4, 2000. Information Releasing System, Server, and Recording Medium by The McElroy Translation Company, Nov. 2007.*

(Continued)

*Primary Examiner*—Joshua Joo
(74) *Attorney, Agent, or Firm*—Finnegan, Henderson, Farabow, Garrett & Dunner, L.L.P.

(57) ABSTRACT

A community server categorizes and accumulates messages exchanged by users on a virtual community for respective topics. The community server includes a subscription type setting unit, which provides, to each user and predetermined administrator, a mechanism for selecting a subscription type indicating the way each user subscribes to messages posted to the virtual community. For this purpose, the subscription type setting unit manages the subscription types of respective users for each community using a subscription type table of community management information, and changes the subscription type in the subscription table in accordance with a request from each user and administrator.

6 Claims, 18 Drawing Sheets

U.S. PATENT DOCUMENTS

| | | | |
|---|---|---|---|
| 6,898,636 B1* | 5/2005 | Adams et al. | 709/229 |
| 7,197,470 B1* | 3/2007 | Arnett et al. | 705/10 |
| 2001/0000192 A1* | 4/2001 | Gonzalez et al. | 707/3 |
| 2002/0059244 A1* | 5/2002 | Bunney et al. | 707/10 |
| 2003/0050976 A1* | 3/2003 | Block et al. | 709/203 |
| 2005/0125504 A1* | 6/2005 | Leeds | 709/217 |

FOREIGN PATENT DOCUMENTS

| | | |
|---|---|---|
| JP | 2000-123033 | 4/2000 |
| JP | 2000-187631 | 7/2000 |

OTHER PUBLICATIONS

Umeki, Hideo et al., "Platform for Community-Based Collaborative Knowledge Creation", Toshiba Review, pp. 14-18, vol. 56 No. 5, May 2001.

Notification of Reasons for Rejection mailed Oct. 2, 2007, in corresponding Japanese Application No. 2001-145247.

Notification of Reasons for Rejection mailed Jun. 17, 2008, in corresponding Japanese Application No. 2001-145247, 6 pages.

T. Mizuyoshi, "Foundations of Internet Understanding by Touch No. 7," Mechanism of Net News, Nikkei Open System, Mar. 15, 1999, pp. 176-187, vol. 72, Nikkei Business Publications, Inc., Japan.

* cited by examiner

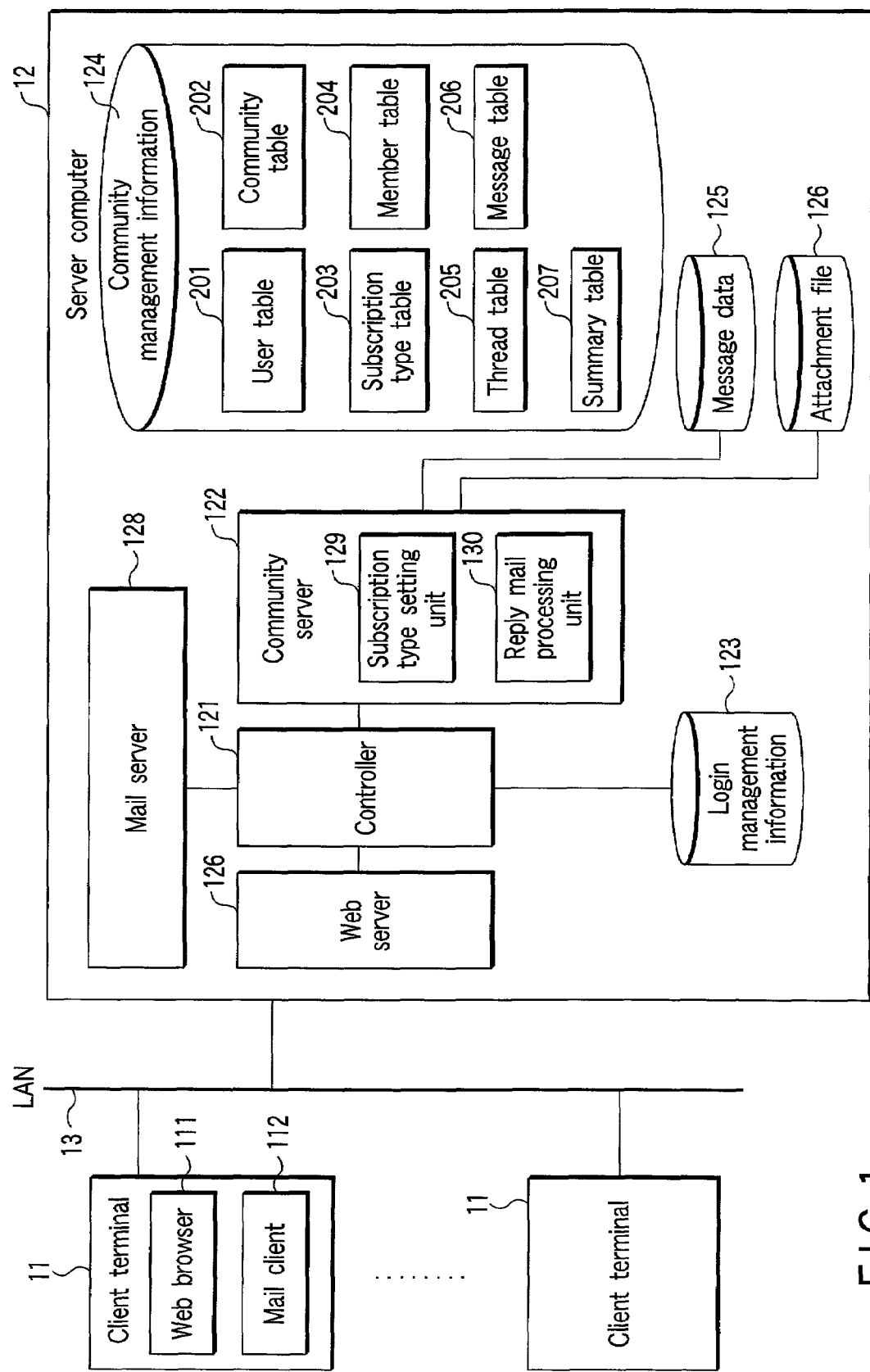
F I G. 1

User table

| User ID | User name | Mail address |
| --- | --- | --- |
| U00001 | Ichiro Tanaka | ichiro.tanaka@xxxx.co.jp |
| U00002 | Taro Yamada | taro.yamada@xxxx.co.jp |
| ... | ... | ... |

FIG. 6

Community table

| Community ID | Community name | Community type | Member ID list |
| --- | --- | --- | --- |
| C001 | Community A | Open | M000001, M000004,... |
| C002 | Community B | Membership | M000002, M000003,... |
| ... | ... | ... | ... |

FIG. 7

Subscription type table

| User ID | User name | Community ID | Subscription type | Mail address |
|---------|-----------|--------------|-------------------|--------------|
| U00001 | Ichiro Tanaka | C001 | Web | |
| U00001 | Ichiro Tanaka | C002 | Mail | ichiro.tanaka@xxx.co.jp |
| U00002 | Taro Yamada | C005 | Web | |

FIG. 8

Member table

| Member ID | Member type | User name |
|---|---|---|
| M000001 | Member | Ichiro Tanaka |
| M000002 | Temporary registered member | Taro Yamada |
| M000003 | Intending member | Ichiro Tanaka |
| M000004 | Anonymous | Taro Yamada |
| ... | ... | ... |

Thread table

| Community ID | Thread ID list |
|---|---|
| C001 | T01001, T01002, ... |
| C002 | T02001, ... |
| ... | ... |

Message table

| Thread ID | Message ID | Message data (URL) |
|---|---|---|
| T01001 | M00000001 | XXXXXXXXXXXXXXXX |
| | M00000002 | YYYYYYYYYYYYYYYY |
| | ... | ... |

FIG. 11

Summary table

| Thread ID | Message ID | Revision | Message data (URL) |
|---|---|---|---|
| T01001 | S00000001 | 1 | MMMMMMMMMMMMMMMM |
| | S00000002 | 2 | NNNNNNNNNNNNNNNN |
| | ... | ... | ... |
| | S0000000n | n | PPPPPPPPPPPPPPPP |

FIG. 12

List of communities to which user "Ichiro Tanaka" belongs

| Community name | Subscription type |
|---|---|
| Community A | Web ▼ |
| Community B | Web ▼ |
| ... | ... |

FIG. 13A

List of communities to which user "Ichiro Tanaka" belongs

Community name     Subscription type

Community A     Web ▼
Community B     Web
                  Mail   Click
                  Remove

FIG. 13B

List of communities to which user "Ichiro Tanaka" belongs

| Community name | Subscription type |
|---|---|
| Community A | Mail ▼ |
| Community B | Web ▼ |
| ... | ... |

FIG. 13C

Community list

Community name

☑ Community A  ～ Select community A

☐ Community B

...

F I G. 14A

User list of community A

| User name | Subscription type |
|---|---|
| Ichiro Tanaka | Web ▼ |
| Taro Yamada | Mail ▼ |
| ... | ... |

F I G. 14B

User list of community A

| User name | Subscription type |
|---|---|
| Ichiro Tanaka | Web ▼ |
| Taro Yamada | Mail ▼ |
| | Web |
| | Mail     Click |
| ... | Remove ↙ |

FIG. 15A

User list of community A

| User name | Subscription type |
|---|---|
| Ichiro Tanaka | Web ▼ |
| Taro Yamada | Remove ▼ |
| ... | ... |

FIG. 15B

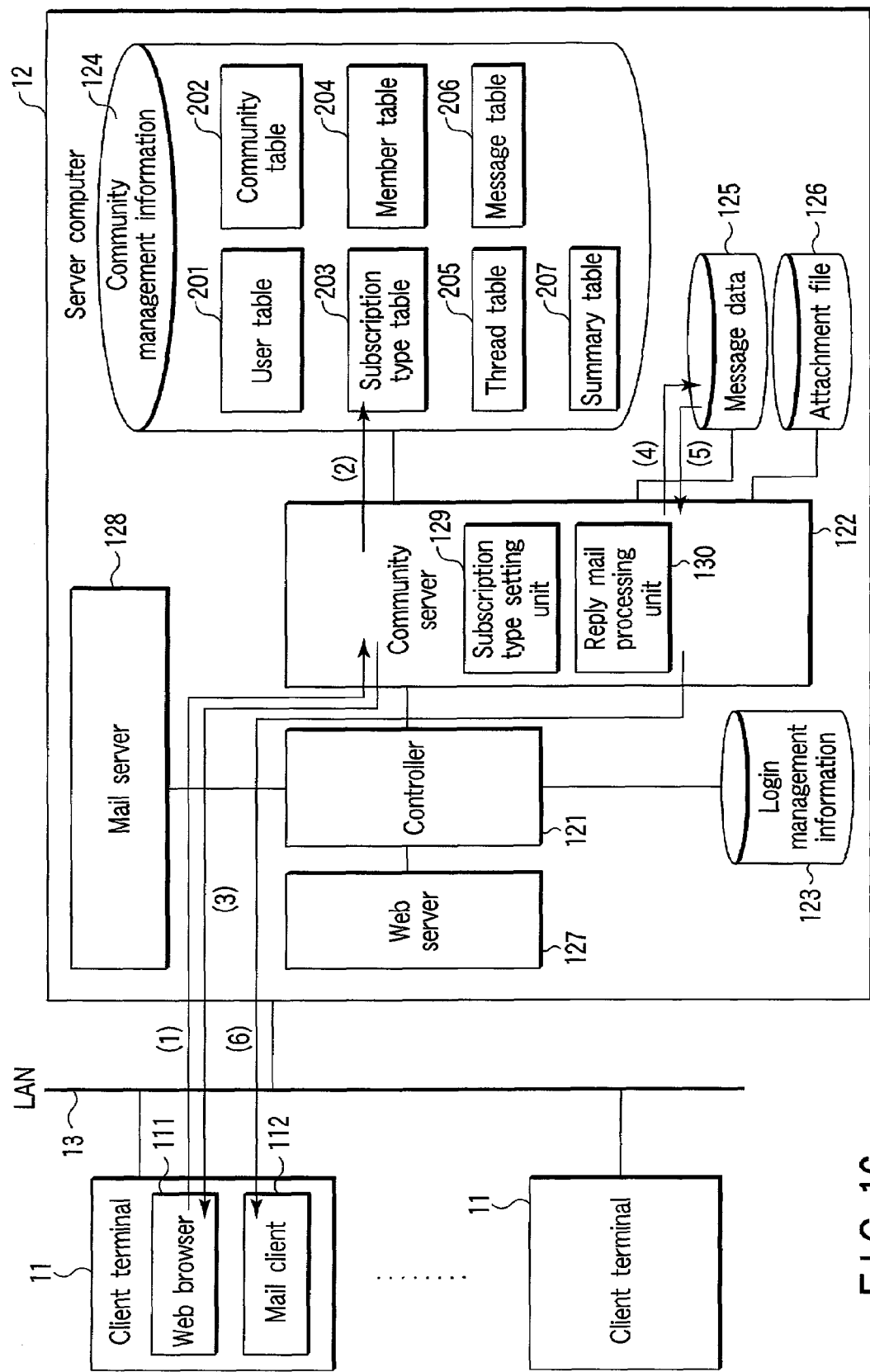
F I G. 16

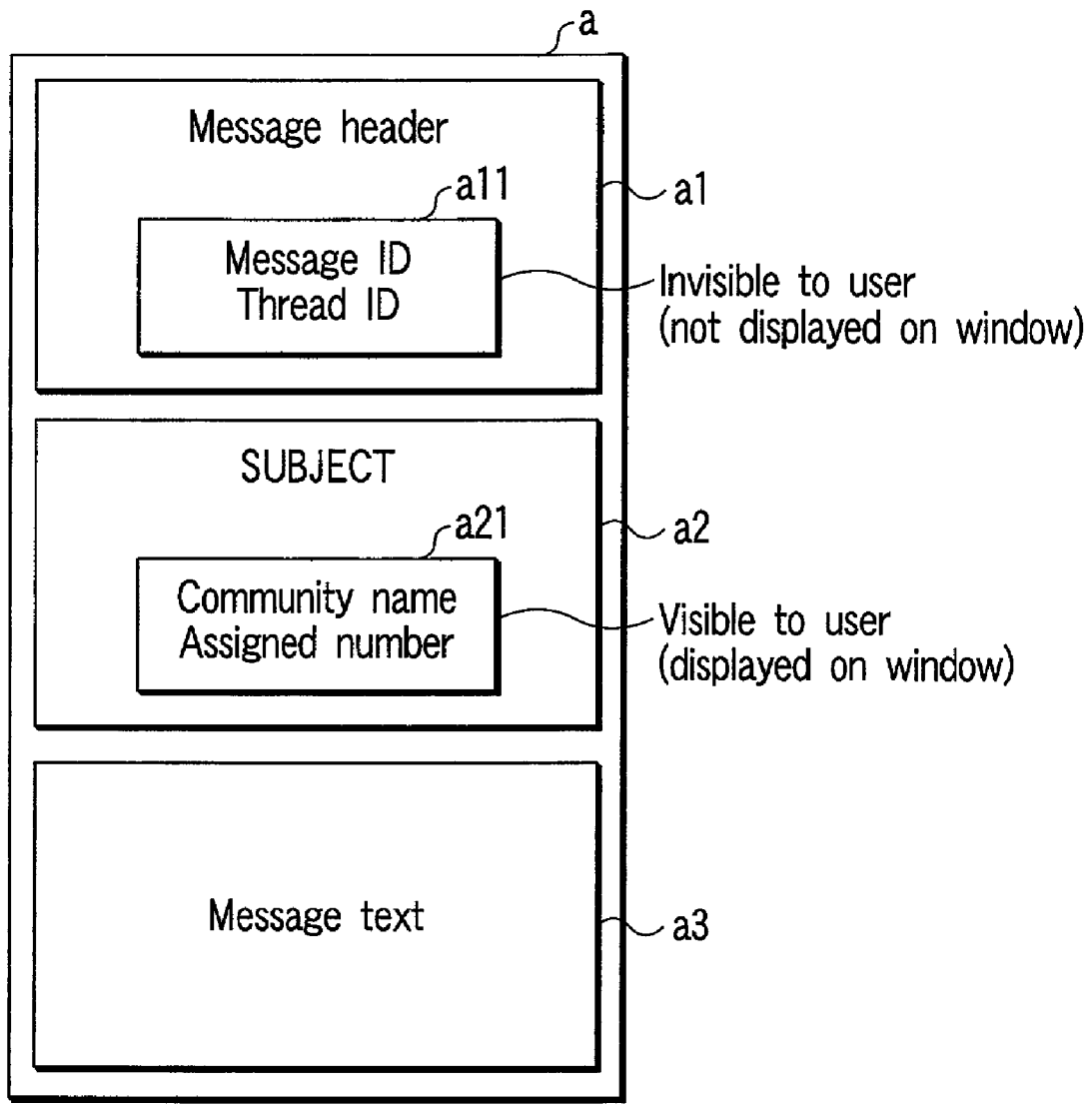
F I G. 20

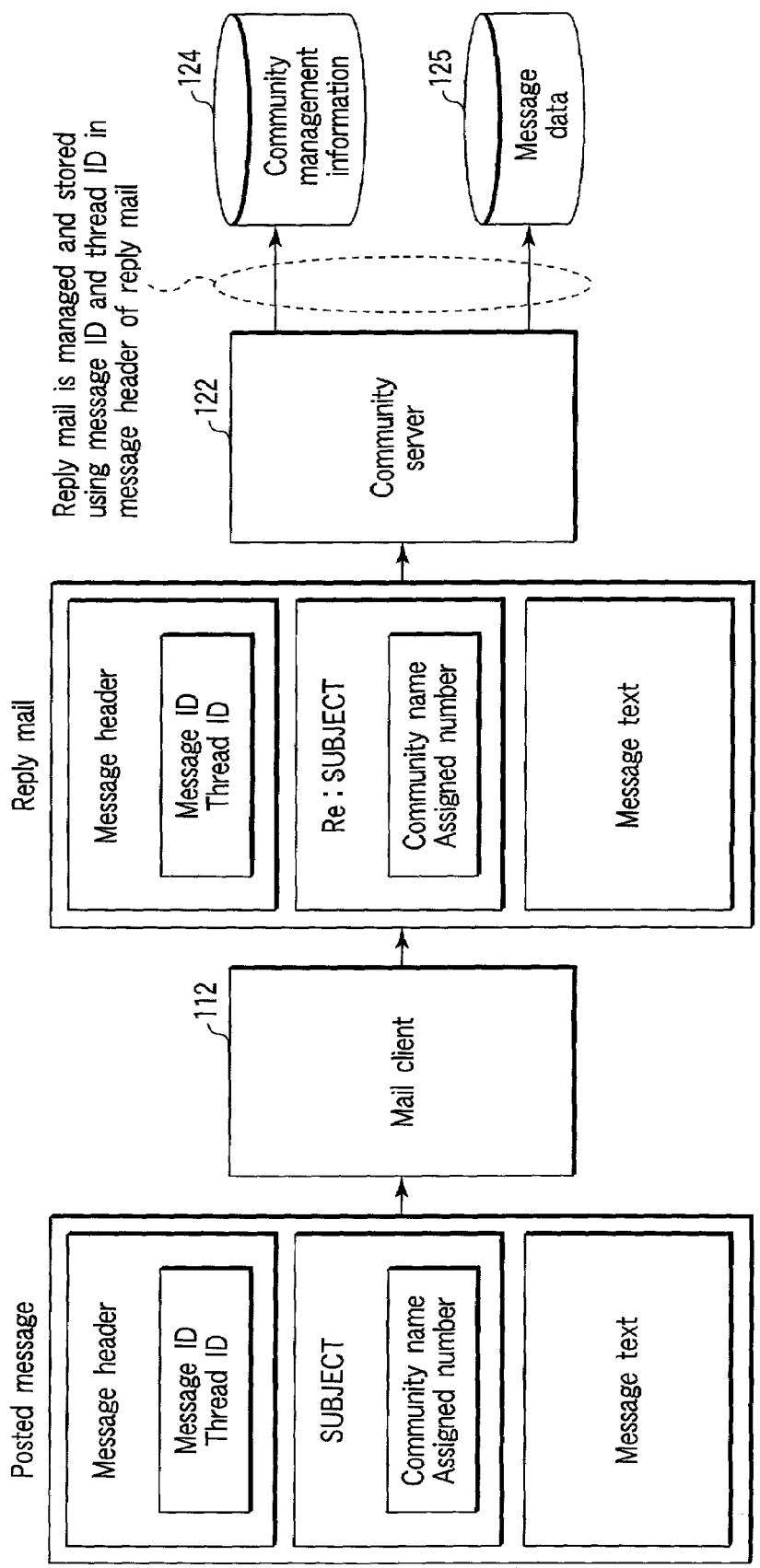
F I G. 21

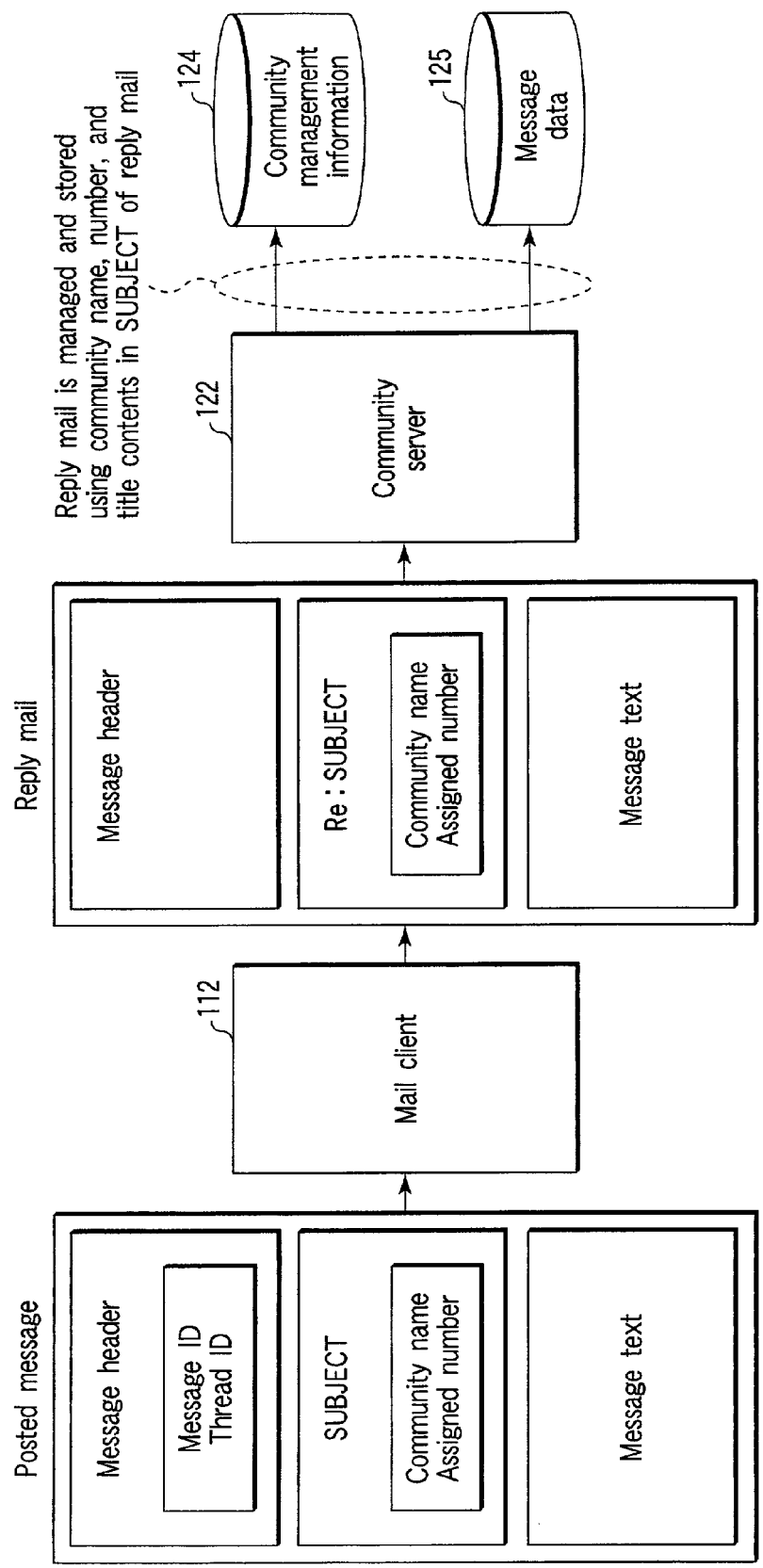
F I G. 22

COMMUNITY-BASED COLLABORATIVE KNOWLEDGE SYSTEM, AND MESSAGE SUBSCRIPTION TYPE SETTING METHOD AND REPLY MESSAGE PROCESSING METHOD IN THAT SYSTEM

CROSS-REFERENCE TO RELATED APPLICATIONS

This application is based upon and claims the benefit of priority from the prior Japanese Patent Application No. 2001-145247, filed May 15, 2001, the entire contents of which are incorporated herein by reference.

BACKGROUND OF THE INVENTION

1. Field of the Invention

The present invention relates to a community-based collaborative knowledge system used in a knowledge management system, and a message subscription type setting method and reply message processing method in that system and, more particularly, to a community-based collaborative knowledge system that supports knowledge accumulation using a virtual community in which many unspecified users participate, and a message subscription type setting method and reply message processing method in that system.

2. Description of the Related Art

In recent years, an increasing number of enterprises are introducing groupware which can be used to share information among a plurality of users. As typical groupware, an e-mail system, workflow system, and the like are known. Recently, a knowledge management system used to support knowledge and information sharing is beginning to be developed.

The knowledge management system accumulates and manages individual know-how as a knowledge database in addition to Web information and digital file information, and allows to efficiently use knowledge and information when it is combined with a search function (e.g., natural language search).

For such knowledge management system, how to collect and accumulate knowledge such as individual know-how is an important issue. Since knowledge such as individual know-how is so-called tacit knowledge, and does not have any predetermined format unlike Web information and digital file information, it is difficult to automatically collect and accumulate such knowledge.

Hence, the development of a knowledge management system having a community-based collaborative knowledge function is required recently. By implementing a mechanism for automatically collecting and accumulating knowledge such as individual know-how, tacit knowledge can be exploited like explicit knowledge such as Web information and digital file information.

However, since the conventional knowledge management system has a standardized user interface for utilizing collected and accumulated knowledge, some users are forced to utilize collected and accumulated knowledge via such interface in place of their favorite interfaces.

Upon collecting and accumulating information exchanged by an e-mail system as knowledge, it is effective to embed control information in a message header so as to efficiently categorize and accumulate the collected knowledge. However, some mailers that the users may use cannot recognize and miss the intentionally embedded control information.

BRIEF SUMMARY OF THE INVENTION

It is an object of the present invention to provide a community-based collaborative knowledge system which can implement a mechanism that can automatically and efficiently collect and accumulate knowledge such as individual know-how, and allows to share various kinds of knowledge, and a message subscription type setting method and reply message processing method in that system.

In order to achieve the above object, according to the first aspect of the present invention, there is provided a community-based collaborative knowledge system which can be connected to a plurality of client terminals via a network, and supports knowledge accumulation by categorizing and accumulating messages posted from each client terminal to a virtual community, comprising access control means for making user authentication of a client terminal as an access request source so as to permit the client terminal to post a message, and community processing means for managing a virtual community in which a plurality of client terminals can participate, and categorizing and accumulating messages posted, to the virtual community, from the client terminals, which are granted access permission by the access control means, for respective topics, the community processing means including message subscription type setting means for setting a subscription type indicating the way a user subscribes to the categorized and accumulated messages in accordance with an instruction from that user.

According to the second aspect of the present invention, there is provided a community-based collaborative knowledge system which can be connected to a plurality of client terminals via a network, and supports knowledge accumulation by categorizing and accumulating messages posted from each client terminal to a virtual community, comprising access control means for making user authentication of a client terminal as an access request source so as to permit the client terminal to post a message, and community processing means for managing a virtual community in which a plurality of client terminals can participate, and categorizing and accumulating messages posted, to the virtual community, from the client terminals, which are granted access permission by the access control means, for respective topics, the community processing means including message subscription type setting means for setting a subscription type indicating the way a user subscribes to the categorized and accumulated messages in accordance with an instruction from a predetermined administrator.

Since the community-based collaborative knowledge system of the first and second aspects has a mechanism for selecting a subscription type of messages posted to the virtual community, each user can utilize the collected/accumulated knowledge via his or her desired interface. Since a predetermined administrator can set this subscription type, subscription management of messages in the virtual community can be done together.

According to the third aspect of the present invention, there is provided a community-based collaborative knowledge system which can be connected to a plurality of client terminals via a network, and supports knowledge accumulation by categorizing and accumulating messages posted from each client terminal to a virtual community, comprising access control means for making user authentication of a client terminal as an access request source so as to permit the client terminal to post a message, and community processing means for managing a virtual community in which a plurality of client terminals can participate, and categorizing and accumulating messages posted, to the virtual community, from the client terminals, which are granted access permission by the access control means, for respective topics, the community processing means including reply message processing means for, when a reply mail message used to post a reply message is sent back from the client terminal in response to a mail message used to deliver the categorized and accumulated message to a subscriber, automatically determining a virtual community to which the reply message should belong by analyzing a message header of the reply mail message, and categorizing and accumulating the reply message.

According to the fourth aspect of the present invention, there is provided a community-based collaborative knowledge system which can be connected to a plurality of client terminals via a network, and supports knowledge accumulation by categorizing and accumulating messages posted from each client terminal to a virtual community, comprising access control means for making user authentication of a client terminal as an access request source so as to permit the client terminal to post a message, and community processing means for managing a virtual community in which a plurality of client terminals can participate, and categorizing and accumulating messages posted, to the virtual community, from the client terminals, which are granted access permission by the access control means, for respective topics, the community processing means including reply message processing means for, when a reply mail message used to post a reply message is sent back from the client terminal in response to a mail message used to deliver the categorized and accumulated message to a subscriber, automatically determining a virtual community to which the reply message should belong by analyzing a subject of the reply mail message, and categorizing and accumulating the reply message.

In the community-based collaborative knowledge system of the third and fourth aspects, upon collecting and accumulating information exchanged by the e-mail system as knowledge, collected knowledge can be efficiently categorized and accumulated using control information which is invisible to the user. Also, since this system has a mechanism for analyzing the subject of each message in addition to the message header, compatibility can be assured even for a mailer which misses intentionally embedded control information without recognizing it, and differences among mailers that the users use can be absorbed.

According to the present invention, since the community-based collaborative knowledge system of the first and second aspects has a mechanism for selecting a subscription type of messages posted to the virtual community, each user can utilize the collected/accumulated knowledge via his or her desired interface. Since a predetermined administrator can set this subscription type, subscription management of messages in the virtual community can be done together.

Upon collecting and accumulating information exchanged by the e-mail system as knowledge, collected knowledge can be efficiently categorized and accumulated using control information which is invisible to the user. Also, since the system has a mechanism for analyzing the subject of each message in addition to the message header, compatibility can be assured even for a mailer which misses intentionally embedded control information without recognizing it, and differences among mailers that the users use can be absorbed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the system arrangement of a community-based collaborative knowledge system according to an embodiment of the present invention;

FIG. 6 shows an example of a user table used in the community-based collaborative knowledge system of this embodiment;

FIG. 7 shows an example of a community table used in the community-based collaborative knowledge system of this embodiment;

FIG. 8 shows an example of a subscription type table used in the community-based collaborative knowledge system of this embodiment;

FIG. 9 shows an example of a member table used in the community-based collaborative knowledge system of this embodiment;

FIG. 10 shows an example of a thread table used in the community-based collaborative knowledge system of this embodiment;

FIG. 11 shows an example of a message table used in the community-based collaborative knowledge system of this embodiment;

FIG. 12 shows an example of a summary table used in the community-based collaborative knowledge system of this embodiment;

FIGS. 13A to 13C show state transition of Web browser window contents upon changing the message subscription type on a personal window in the community-based collaborative knowledge system of this embodiment;

FIGS. 14A and 14B are first views showing state transition of Web browser window contents upon changing the message subscription type on an administrator window in the community-based collaborative knowledge system of this embodiment;

FIGS. 15A and 15B are second views showing state transition of Web browser window contents upon changing the message subscription type on an administrator window in the community-based collaborative knowledge system of this embodiment;

FIG. 16 is a diagram showing the flow of a subscription type change process in the community-based collaborative knowledge system of this embodiment;

FIG. 20 shows the structure of a reply mail message in the community-based collaborative knowledge system of this embodiment;

FIG. 21 is a diagram showing the first processing method of a reply mail message in the community-based collaborative knowledge system of this embodiment;

FIG. 22 is a diagram showing the second processing method of a reply mail message in the community-based collaborative knowledge system of this embodiment.

DETAILED DESCRIPTION OF THE INVENTION

A preferred embodiment of the present invention will be described hereinafter with reference to the accompanying drawings.

FIG. 1 shows the arrangement of a community-based collaborative knowledge system according to an embodiment of the present invention. This community-based collaborative knowledge system is used as a knowledge management system having a community-based collaborative knowledge function, and categorizes and accumulates knowledge using a virtual community to which a plurality of client terminals 11 can commonly access. Prior to a detailed description of the arrangement, an outline of the community-based collaborative knowledge system according to this embodiment will be explained first using FIGS. 2 to 5.

Figure 2:
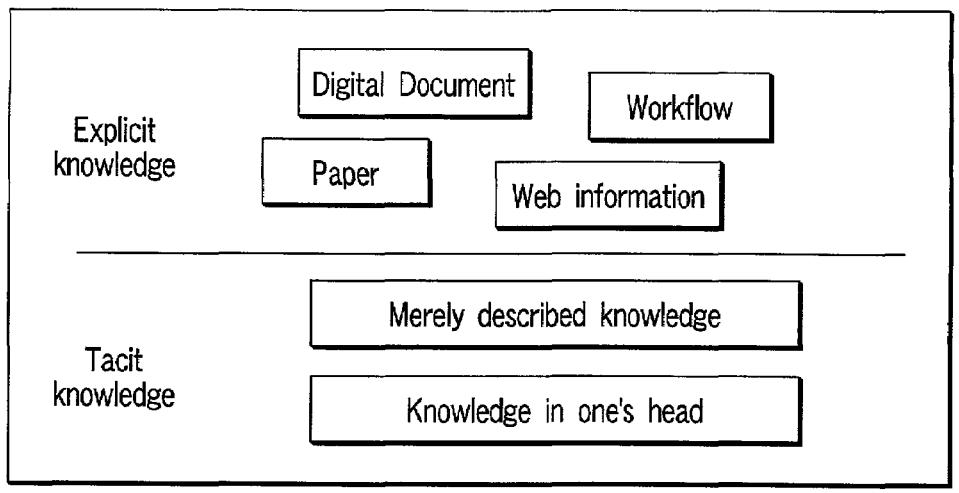
FIG. 2 is a view for explaining knowledge processed by the community-based collaborative knowledge system of this embodiment.

As shown in FIG. 2, there are two kinds of knowledge, i.e., "explicit knowledge" and "tacit knowledge". Nowadays, arrangement and management systems such as a document management system, Web server, and the like for explicit information (explicit knowledge) have nearly reached a point of maturity. However, in practice, these systems cannot support all aspects of "accumulation of knowledge". This is because there exists very indefinitive information such as casual conversation exchanged via mail messages, knowledge only in one's head, and the like. Such information is called "tacit knowledge". How to process and share such tacit knowledge is an important issue. It is difficult for a conventional system to support accumulation of tacit knowledge, and a system that can process tacit knowledge is required.

A community-based collaborative knowledge system of this embodiment is a tool which converts such information called tacit knowledge into explicit knowledge, and aims at promoting knowledge accumulation, allows discussions in a group in a virtual community having an electronic bulletin board format, and categorizes and accumulates messages (posted articles) for respective topics. Also, this system can generate a summary of one topic (to be referred to as a thread hereinafter). The thread means a bundle of given related knowledge on the virtual community. The summary is a message having a role of a kind of proceeding that summarizes the discussions in the group, and can be generated for each individual thread.

Figure 3:
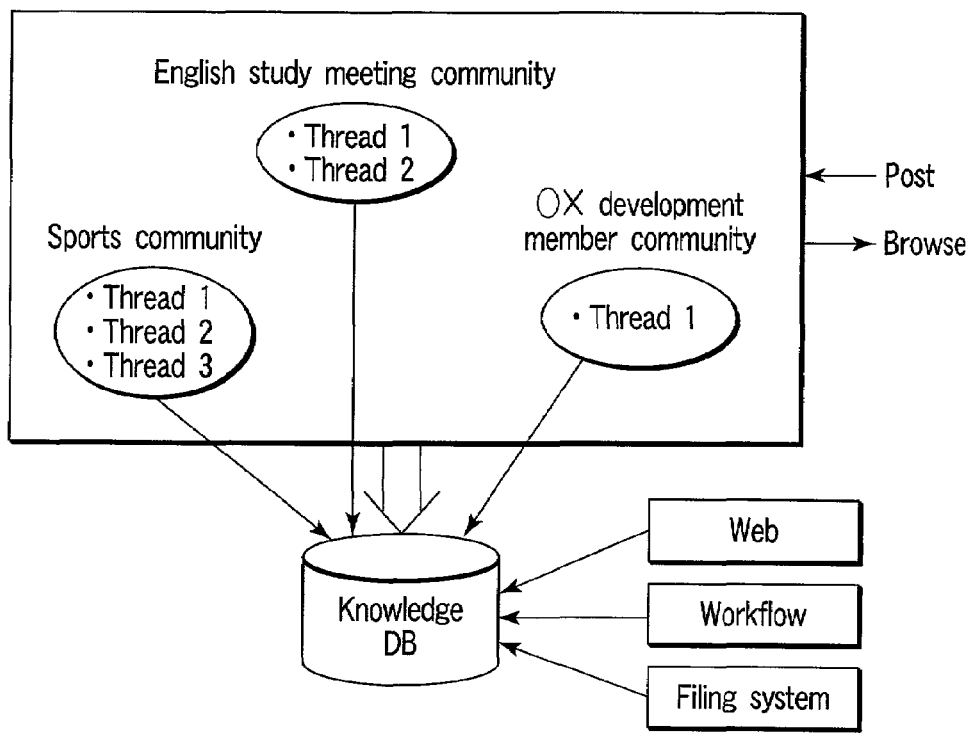
FIG. 3 is a view for explaining knowledge accumulation process in the community-based collaborative knowledge system of this embodiment.

A message is posted via an e-mail message or by input from a Web browser, and posted messages are saved in a server which forms the community-based collaborative knowledge system. In this community-based collaborative knowledge system, a message can also be posted using an e-mail message, and has a function as a mailing list. When respective users communicate with each other via mail messages, tacit knowledge is accumulated unconsciously. FIG. 3 shows this state.

FIG. 3 shows "sports community" as a virtual community associated with sports, "English study meeting community" as a virtual community associated with an English study meeting, and "○× development member community" as a virtual community of given development members. Messages posted by respective users are categorized and accumulated for these virtual communities, and are categorized for respective threads in each virtual community. FIG. 3 shows a case wherein messages associated with three different topics, i.e., threads 1, 2, and 3 are currently accumulated in "sports community", messages associated with two different topics, i.e., threads 1 and 2 are accumulated in "English study meeting community", and messages associated with one topic, i.e., thread 1 are accumulated in "○× development member community". Messages posted to these virtual communities are accumulated as knowledge information in a knowledge database (knowledge DB) as well as other kinds of knowledge (explicit knowledge collected from webs, workflow, filing systems, and the like). Especially, when "summary" messages generated for respective threads are collected in the knowledge DB and are applied to full-text search, natural language search, and the like prior to other messages, the "flow of messages" as so-called flow information can be efficiently utilized as static stock information.

<Site>

In this specification, the server function of this community-based collaborative knowledge system is called a "site". An administrator is present in the site, and manages site information. The site information includes:

(1) User Information

This information is associated with users who can use the site.

The site administrator can register, delete, and change this information.

(2) Community Creation Authority Information

This information is authority information required upon creating a virtual community.

A virtual community is a kind of electronic bulletin board to which a plurality of users can commonly access to post and browse messages, and indicates a "site" where people who have the same objective communicate with each other. Each user accesses a community with a theme corresponding to his or her objective, and acquires desired knowledge or posts a message (article). Each community has at least one administrator (a community creator becomes a default administrator but this can be changed). The authority associated with creation of a community can be selected from the following two choices.

All the registered users can create a community.

Only the user who is authorized by the site administrator can create a community.

(3) Category Information of Community

This information is category information used to categorize communities.

The site administrator can register, delete, and change this information.

<Community>

A community will be explained below. Community information (property of a community) used to manage each community includes:

(1) Name

This indicates the name of community.

(2) Posting Mail Address

This address is a mail address assigned to each community. When the user sends a mail message to this address, its contents are automatically registered in the corresponding community as a new message.

(3) Subject Information of Received Mail

The user can participate in a community in two ways; either he or she can "subscribe via Web" or browse and post messages via a Web browser, or he or she can "subscribe via mail" or receive an automatic mail delivery service of new messages in addition to browsing and posting of messages via the Web browser. For a user who selected "subscribe via mail", when a new message is posted to a given community, that new message is automatically delivered as an e-mail message. In this case, Subject information of the delivered e-mail message is appended with "Subject information of received mail" (e.g., information such as {community name, message number}).

(4) Creator

This indicates the user name of the user who created a community.

(5) Date of Creation

This indicates the date of creation of a community.

(6) Introduction of Community

This indicates a simple introduction of a community.

(7) Category of Community

As described above, communities can be categorized according to their contents, and information associated with a category is held for each community. The category is registered by the site administrator.

(8) Community Type

The community type means the open level of a community. The open levels of communities include "open" that allows everyone to participate in, "membership" for only a group of authorized members, and "closed" that is not open to the public other than authorized members.

(9) Statistic Information

This information includes the number of users who belong to each community, posting count ranking for respective members, and the like.

(10) Administrator

This indicates the name of an administrator who manages a given community.

(11) Member

This indicates users who belong to (can access) a given community.

(12) Message Delete Authority

This indicates a user who is authorized to delete a posted message. There are two choices:

community administrator alone community administrator and poster

<Message and Thread>

A message and thread will be described below.

A message is each of comments (posted articles) exchanged in discussion in a community. The message can be appended with a plurality of files. The message can be posted by input from a Web browser or by sending a mail message to the mail address of a given community.

On the other hand, a thread is a bundle of messages associated with a given topic. Discussion progresses via various opinions (messages) for one topic and reaches a conclusion. This conclusion is a "summary". This community-based collaborative knowledge system also has a creation support function associated with "summary". Using this creation support function, a "summary" as a conclusion of a given topic can be easily created while quoting messages, appended files, and the like in the corresponding thread.

Figure 4:
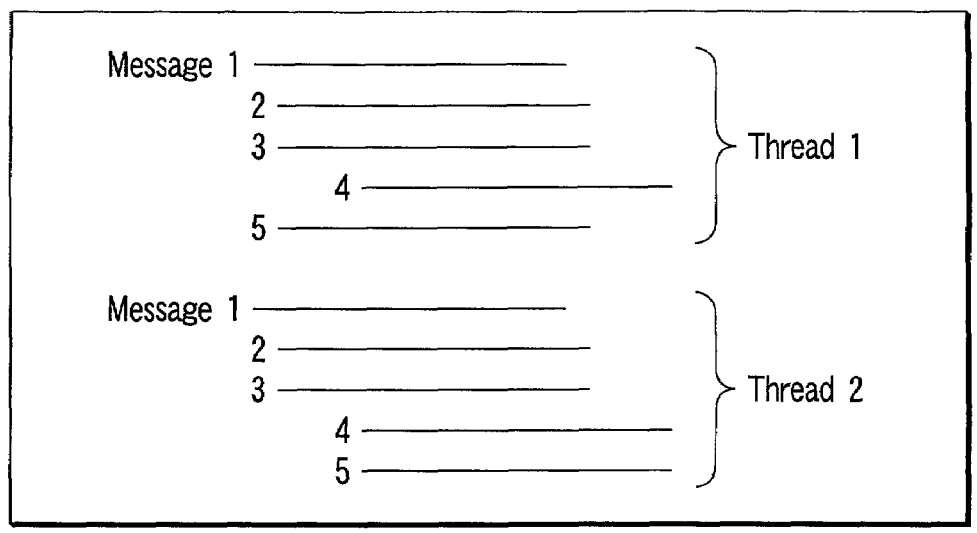
FIG. 4 is a view for explaining the relationship between messages and threads managed by the community-based collaborative knowledge system of this embodiment.

FIG. 4 shows an example of the hierarchical structure of messages which form a thread. Referring to FIG. 4, thread 1 contains five messages 1, 2, 3, 4, and 5. The structure of thread 1 corresponds to a case wherein message 1 was posted first, messages 2 and 3 were posted as reply (response) messages to message 1, message 4 was posted as a reply (response) message to message 3, and message 5 was further posted as a reply (response) message to message 1.

Thread 2 also contains five messages 1, 2, 3, 4, and 5. The structure of thread 2 corresponds to a case wherein messages 2 and 3 were posted as reply (response) messages to message 1 which was posted first, and messages 4 and 5 were posted as reply (response) messages to message 3.

When a message different from a reply to each message of threads 1 and 2 is newly posted to the same community as threads 1 and 2, thread 3 is assigned to that new message.

<Summary>

Figure 5:
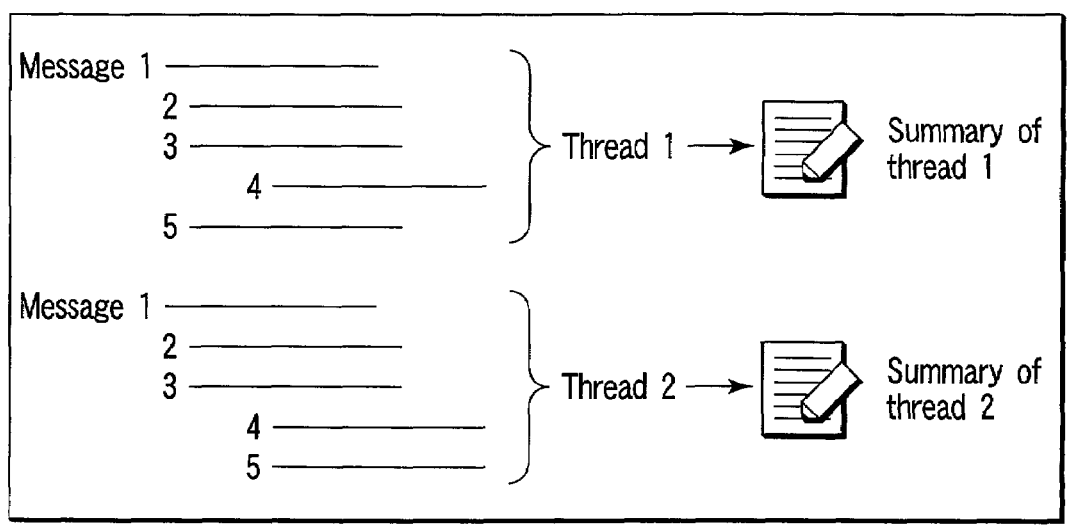
FIG. 5 is a view for explaining the relationship between messages and "summary" messages managed by the community-based collaborative knowledge system of this embodiment.

A "summary" is "conclusion" of discussion (thread). In other words, the "summary" corresponds to "proceeding" in, e.g., a business meeting, or corresponds to "specification" for review upon development. As shown in FIG. 5, one "summary" corresponds to one thread. That is, the user or administrator creates a "summary" as a conclusion for each thread, and manages it as a special form of messages which form the corresponding thread. The "summary" can be appended with a plurality of files as in normal messages.

The "summary" can be revised, and a new "summary" is created by, e.g., updating the already created "summary" and can be registered as the latest "summary".

<Message Posting by Mail>

A message posted to each community via a mail message is processed in the following sequence.

(1) A user posts a mail message to a mail address assigned to a community as a destination.

(2) The server of the community-based collaborative knowledge system simultaneously acquires mail messages to all communities from a mail server.

(3) The server of the community-based collaborative knowledge system checks the destinations of the messages based on their posting mail addresses and distributes them.

(4) The server of the community-based collaborative knowledge system determines a thread and layer of the corresponding community to which the message of interest is to be registered on the basis of header information (or title) of the acquired mail message, and registers text of the acquired mail message thereto as a message.

A message posted to each community as a mail message is automatically stored in the corresponding location by the aforementioned process. The user need only post a message as if he or she were posting a comment to a mailing list.

<Message Subscription Type>

A user who uses the community-based collaborative knowledge system can select one of two choices as the message subscription type, as described above.

subscribe via Web browser (the user accesses the URL (Uniform Resource Locator) of the community-based collaborative knowledge system)

subscribe via mail

The user can subscribe (can also post a message) via a Web browser independently of the subscription type of his or her choice. That is, the user can select whether or not a new message is automatically delivered to him or her when it is posted. If the user selects mail subscription, a message is delivered as a mail message. The user can post a reply message by only sending a reply to the delivered mail message. The user can select the subscription type for each community he or she belongs.

<System Arrangement>

The system arrangement of the community-based collaborative knowledge system according to this embodiment will be described below with reference to FIG. 1.

The community-based collaborative knowledge system of this embodiment is implemented by a server computer 12 which can be connected to a plurality of client terminals 11 via a computer network 13 such as a LAN or the like. Each of the server computer 12 and client terminals 11 has a CPU, a main memory, a magnetic disk device as a storage device, and input/output devices including an input unit such as a keyboard, mouse, and the like, and a display unit such as a display (none of them are shown).

On each client terminal 11, one or both of a Web browser 111 and mail client 112 run. Each user can use a community-based collaborative knowledge process from each client terminal 11 by designating the URL (Uniform Resource Locator) indicating the resource for the community-based collaborative knowledge system built on the server computer 12 from the Web browser 111 or sending a mail message from the mail client 112 to a mail address of each community managed by a community server 112.

The community-based collaborative knowledge function on the server computer 12 is implemented mainly by software programs of a controller 121, the community server 122, a Web server 127, a mail server 128, and the like, and management information and actual data used to post and browse messages by these software programs. The management information includes login management information (user ID+password) 123 used to authenticate the user of each client terminal 11, and community management information 124 used to manage each community. Also, the actual data include message data 125 and attachment files 126.

The controller 121 controls the overall operations associated with the community-based collaborative knowledge function, and has a mediation function between the community server 122 as a core program of this community-based collaborative knowledge system, and the Web server 127 and mail server 128, and also a user authentication function when each client terminal 11 logs into the community server 122 via the Web server 127 and mail server 128. For user authentication, the controller 121 manages the login management information 123. The login management information stores the user IDs, passwords, and the like of individual users who participate in the community-based collaborative knowledge system. With this user authentication, access from each client terminal 11 to the community server 122, which is made to, e.g., post a message, undergoes permission/denial control.

The community server 122 manages and runs communities in which a plurality of client terminals 11 can participate, and categorizes and accumulates messages posted by respective client terminals 11 for respective communities and topics (threads). The community server 122 manages and runs communities using the community management information 124, message data, and attachment files 126. That is, these community management information 124, message data, and attachment files 126 are used as a database for accumulating and manages messages for respective communities.

Furthermore, the community server 122 includes a subscription type setting unit 129 and reply mail processing unit 130. The subscription type setting unit 129 manages the subscription types of users of the client terminals 11 for each individual community as their access destination using the community management information 124. The reply mail processing unit 130 analyzes a reply message posted when the user who selected "subscribe via mail" sends a reply to a delivered message, and automatically stores the reply message in the corresponding location.

Tables which form the community management information 124 will be explained below.

As shown in FIG. 1, the community management information 124 is formed of a user table 201, community table 202, subscription type table 203, member table 204, thread table 205, message table 206, summary table 207, and the like. These tables will be explained below.

<User Table>

FIG. 6 shows an example of the structure of the user table 201 that manages the users. The user table 201 stores user IDs, user names, and mail addresses of users who participate in the community-based collaborative knowledge system of this embodiment. FIG. 6 exemplifies a case wherein a user who has the user ID "U00001", user name "Ichiro Tanaka", and mail address "ichiro.tanaka@xxxx.co.jp", and a user who has the user ID "U00002", user name "Taro Yamada", and mail address "taro.yamada@xxxx.co.jp" are registered.

<Community Table>

FIG. 7 shows an example of the structure of the community table 202 used to manage communities. The community table 202 is used to manage communities created on the community-based collaborative knowledge system of this embodiment and users who participate in respective communities, and stores the community IDs, community names, and community types of communities created on this community-based collaborative knowledge system, and the member ID lists of members who participate in these communities. FIG. 7 shows a case wherein a community with the community ID "C001" and community name "community A" has the community type "open", and users who are assigned the member IDs "M000001", "M000004", . . . participate in this community; and a community with the community ID "C002" and community name "community B" has the community type "membership", and members who are assigned the member IDs "M000002", "M000003", . . . participate in this community. Note that the member IDs are unique throughout the communities, and each user is assigned member IDs, the number of which is equal to the number of communities he or she participates in.

<Subscription Type Table>

FIG. 8 shows an example of the structure of the subscription type table 203 used to manage the subscription types. The subscription type table 203 stores the user IDs and user names of users who participate in the community-based collaborative knowledge system of this embodiment, the community IDs of communities they participate in, subscription types to these communities, and users' mail addresses if the subscription type is "mail". When the user table 201 manages mail addresses, the mail addresses need not always be registered in the subscription type table 203. Conversely, the user table 201 may not manage any mail addresses, and the subscription type table 203 may manage the mail addresses of only users who selected the subscription type "mail".

FIG. 8 shows a case wherein the user who has the user ID "U00001" and user name "Ichiro Tanaka" participates in two communities with the community IDs "C001" and "C002", and selects the subscription type "Web" for the community with the community ID "C001" and the subscription type "mail" for the community with the community ID "C002"; and the user who has the user ID "U00002" and user name "Taro Yamada" participates in a community with the community ID "C005", and selects the subscription type "Web" for that community.

<Member Table>

FIG. 9 shows an example of the structure of the member table 204 used to manage members. The member table 204 stores member types indicating participation attributes associated with communities they participate in, and the user names of users who participate as members. The member types include "member" who has been authorized to participate, "temporary registered member" who is temporarily registered as a member, "intending member" who has applied to participate but has not been authorized to participate yet, and "anonymous" who does not take any participation procedure and participates in a community as a kind of guest.

FIG. 9 shows a case wherein the user who has the user name "Ichiro Tanaka" has the member type "member" for a community in which he participates with the member ID "M000001", and the member type "intending member" for a community in which he participates with the member ID "M000003"; and the user who has the user name "Taro Yamada" has the member type "temporary registered member" for a community in which he participates with the member ID "M000002", and the member type "anonymous" for a community in which he participates with the member ID "M000004".

<Thread Table>

FIG. 10 shows an example of the structure of the thread table 205 used to manage threads. The thread table 205 stores the community IDs of communities, and thread ID lists each including the thread IDs of threads generated in a given community. The thread IDs use unique values throughout the communities.

FIG. 10 shows a case wherein a community with the community ID "C001" includes threads with thread IDs "T01001", "T01002", . . . ; and a community with the community ID "C002" includes threads with thread IDs "T02001", . . . .

<Message Table>

FIG. 11 shows an example of the structure of the message table 206 used to manage messages. The message tables 206 stores the message IDs of messages which form each individual thread, and the URLs of actual data of corresponding messages stored as the message data 125. Note that this URL may be uniquely specified by the corresponding thread ID and message ID and, in such case, the URL field may be omitted.

<Summary Table>

FIG. 12 shows an example of the structure of the summary table 207 used to manage "summary" messages created for respective threads. The summary table 207 stores the message IDs of messages created and registered as "summary" messages of a given thread, the revision numbers of messages when a plurality of "summary" messages are created and registered, and URL information (message data URLs) indicating the locations of actual data of messages associated with the corresponding "summary" messages stored as the message data 125 in correspondence with each thread ID.

As in the message table 206, the URL of the summary table 207 may be uniquely specified by the corresponding thread ID and message ID and, in such case, the URL field may be omitted.

A message subscription type select process in this community-based collaborative knowledge system, which is executed by the subscription type setting unit 129 in the community server 122, will be explained below.

An example of state transition of window contents displayed on the Web browser 111 of each client terminal 11 in the community-based collaborative knowledge system will be explained first with reference to FIGS. 13A to 15B.

FIGS. 13A to 13C show state transition of the Web browser window contents upon changing the message subscription type on a personal window. FIG. 13A shows a list of communities in which the user "Ichiro Tanaka" participates, and the subscription types for these communities. In order to change the message subscription type of "community A" from "Web" to "mail", the user displays a corresponding pull-down menu and selects "mail", as shown in FIG. 13B, thus displaying a changed state, as shown in FIG. 13C. Since this change is sent to the community server 122 and is reflected in the community management information 124 via the subscription type setting unit 129, "mail" is displayed from the next access.

On the other hand, FIGS. 14A to 15B show state transition of Web browser window contents upon changing the message subscription type on an administrator window. FIG. 14A shows a list of communities like "community A", "community B", . . . . Upon selecting "community A", the subscription types of the users "Ichiro Tanaka", "Taro Yamada", . . . who participate in this community are displayed, as shown in FIG. 14B. In order to change the message subscription type of "Taro Yamada" from "mail" to "withdrawal", when the administrator displays a corresponding pull-down menu and selects "withdrawal", as shown in FIG. 15A, the changed state is displayed, as shown in FIG. 15B. Since this change is sent to the community server 122 and is reflected in the community management information 124 via the subscription type setting unit 129, "withdrawal" is displayed from the next access. Note that "withdrawal" means that the corresponding user cannot participate in a community, and a message sent from that user is discarded.

FIG. 16 shows the flow of the subscription type change process, and exemplifies a case wherein the subscription type is changed from "Web" to "mail". When the Web browser 111 designates the URL of a given community, and issues a subscription type change request from the displayed window (1), the subscription type setting unit 129 of the community server 122 searches the subscription type table 203 of the community management information 124 (2) and sends back the found data to the Web browser 111 (3). The user changes the subscription type of a desired community from "Web" to "mail" on that window.

After that, when another user posts a new message, that message is stored in the message data 125 (4). The community server 122 searches for this new message (5), acquires the mail addresses of users with the subscription type "mail" from the subscription type table, and automatically sends that message to their mail clients 112 (6).

Figure 17:
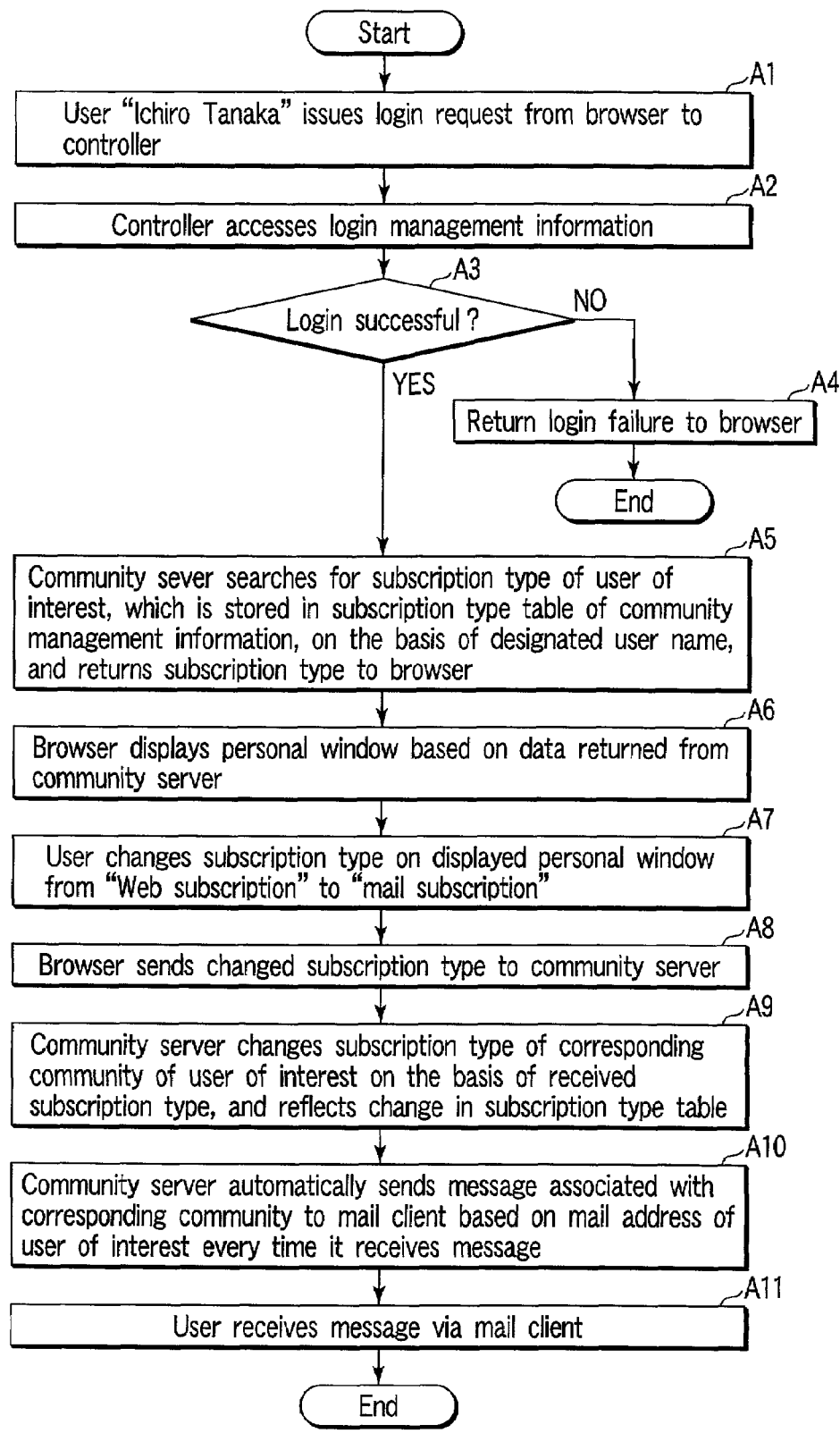
FIG. 17 is a flow chart showing the sequence of the subscription type change process in the community-based collaborative knowledge system of this embodiment.

FIG. 17 is a flow chart showing the sequence of the subscription type change process shown in FIG. 16.

If the user "Ichiro Tanaka" issues a login request to the controller 121 of the server computer 12 (step A1), the controller 121 accesses the login management information 123 (step A2) to check if the user ID and password input from that user are registered, and makes user authentication (step A3) to determine if that login access is permitted. If the user ID and password are not registered in the login management information 123 and the login access has failed (NO in step A3), the controller 121 returns a login failure to the Web browser 111 via the Web server 127 and ends this process (step A4).

On the other hand, if the user ID and password are registered in the login management information 123 and the login access has succeeded (YES in step A3), the subscription type setting unit 129 of the community server 122 searches for the subscription types of the user of interest, which are stored in the subscription type table 203 of the community management information 124, on the basis of the designated user name, and returns them to the Web browser 111 (step A5).

If the Web browser 111 displays the personal window shown in FIG. 13A on the basis of the data returned from the community server 122 (step A6), the user changes the subscription type on the displayed personal window from "Web" to "mail" (step A7). If the Web browser 111 sends the changed subscription type to the community server 122 (step A8), the subscription type setting unit 129 of the community server 122 changes the subscription type of the corresponding community of the user of interest based on the received subscription type, and reflects that change in the subscription type table 203 (step A9).

After that, the community server 122 automatically sends a message to the mail address of the user of interest every time a message associated with that community is received (step A10). On the other hand, the user receives that message via the mail client (step A11).

Figure 18:
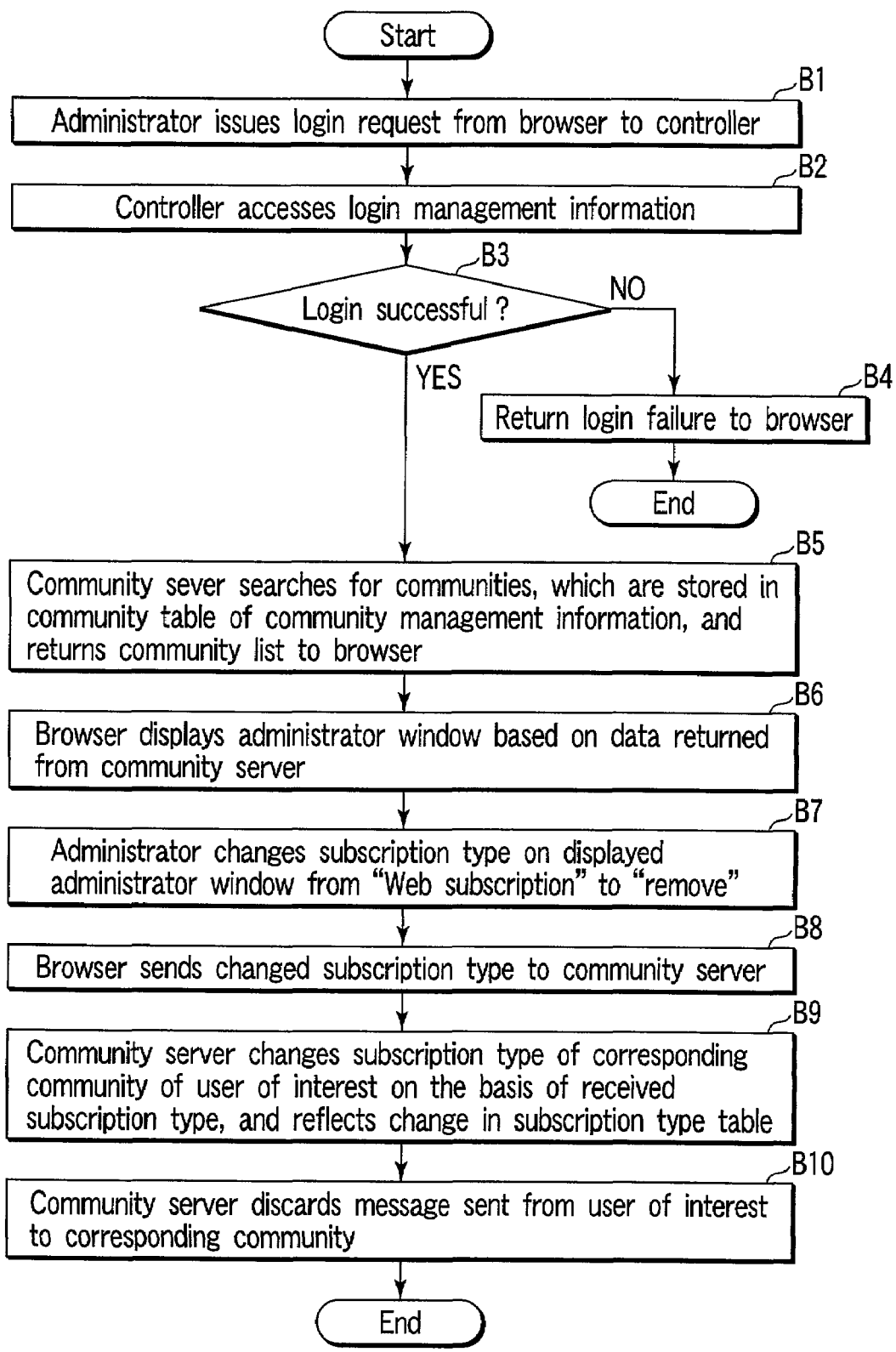
FIG. 18 is a flow chart showing the sequence of a process executed when the administrator removes a certain user from subscription to the community-based collaborative knowledge system of this embodiment.

FIG. 18 is a flow chart showing the sequence of a process executed when the administrator removes a given user from subscription.

If the administrator issues a login request to the controller 121 of the server computer 12 via the Web browser 111 (step B1), the controller 121 accesses the login management information 123 (step B2) to check if the user ID and password input from that user are registered, and makes user authentication (step B3) to determine if that login access is permitted. If the user ID and password are not registered in the login management information 123 and the login access has failed (NO in step B3), the controller 121 returns a login failure to the Web browser 111 via the Web server 127 and ends this process (step B4).

On the other hand, if the user ID and password are registered in the login management information 123 and the login access has succeeded (YES in step B3), the subscription type setting unit 129 of the community server 122 searches for communities stored in the community table 202 of the community management information 124, and returns a community list to the Web browser 111 (step B5).

If the Web browser 111 displays the administrator window shown in FIGS. 14A to 15B on the basis of data returned from the community server 122 (step B6), the administrator changes the subscription type on the displayed administrator window from "Web" to "withdrawal" (step B7). If the Web browser 111 sends the changed subscription type to the community server 122 (step B8), the subscription type setting unit 129 of the community server 122 changes the subscription type of the corresponding community of the user of interest on the basis of the received subscription type, and reflects the change in the subscription type table 203 (step B9).

After that, even if the community server 122 receives a message addressed to the corresponding community from that user, it discards the message (step B10).

In this way, since the community-based collaborative knowledge system of this embodiment comprises the mechanism that allows each user and administrator to select the message subscription type, knowledge can be utilized using a desired interface, and subscription management of messages can be simultaneously made.

A reply mail process in the community-based collaborative knowledge system, which is executed by the reply mail processing unit 130 of the community server, will be explained below.

Figure 19:
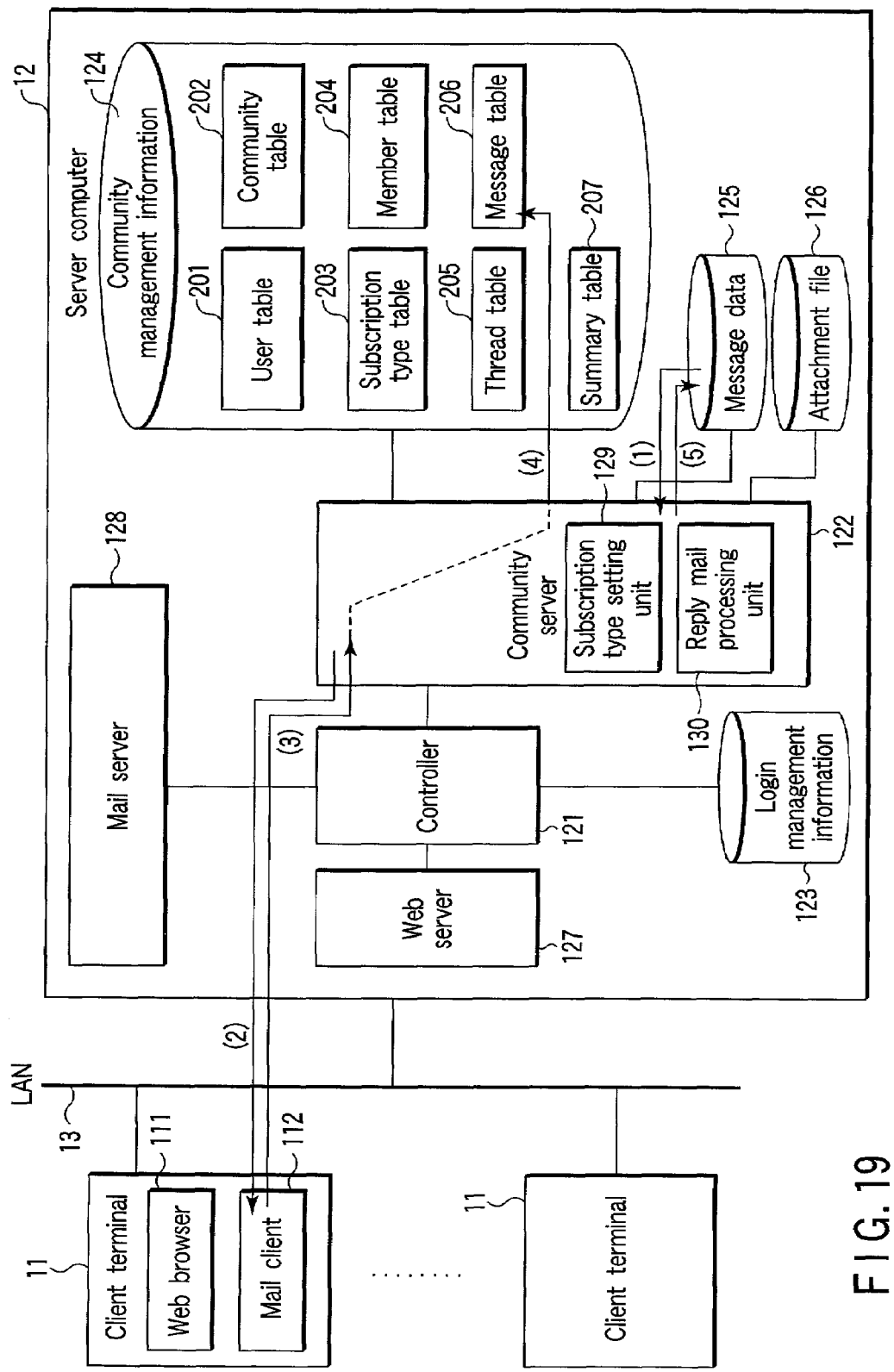
FIG. 19 is a block diagram showing the flow of a mail reply process in response to a message posted to the community-based collaborative knowledge system of this embodiment.

FIG. 19 is a block diagram showing the flow of the mail reply process to a posted message. When the community server 122 finds a posted message (1), it sends the posted message to the mail client 112 (2). At this time, the community server 122 embeds control information used to specify a community and thread in the message header and SUBJECT of the posted message. On the other hand, when the mail client 112 that received the posted message sends a reply to the posted message (3), the reply mail processing unit 130 of the community server 122 manages this reply message as an identical thread in the message table 206 of the community management information 124 (4), and stores that message in the message data 125 (5).

FIG. 20 shows the structure of the posted message. As shown in FIG. 20, posted message a is formed of message header a1, SUBJECT a2, and message text a3. Message header a1 contains a message ID and thread ID all which are not displayed on the window. SUBJECT a2 contains a community name and number a21 assigned to that message, which are displayed on the window.

FIG. 21 shows the first processing method of a reply mail message, and is an explanatory view when the mail client 112 has a function that does not drop (delete) header information.

When a posted message is received by the mail client 112 and the user sends a reply mail message to that message, since the message ID and thread ID in the message header are directly sent to the community server 122, the reply mail processing unit 130 of the community server 122 manages and stores the reply mail in the community management information 124 and message data 125 on the basis of the message ID and thread ID obtained by analyzing the message header.

On the other hand, FIG. 22 shows the second processing method of a reply mail message, and is an explanatory view when header information is dropped (deleted) since the mail client 112 does not have any function of recognizing header information.

When a posted message is received by the mail client 112 and the user sends a reply mail message to that message, since that reply mail message is sent to the community server 122 after the message ID and thread ID in the message header are deleted, the reply mail processing unit 130 of the community server manages that reply mail using the community management information 124 and message data 125 on the basis of the community name, message number, and title obtained by analyzing SUBJECT.

Figure 23:
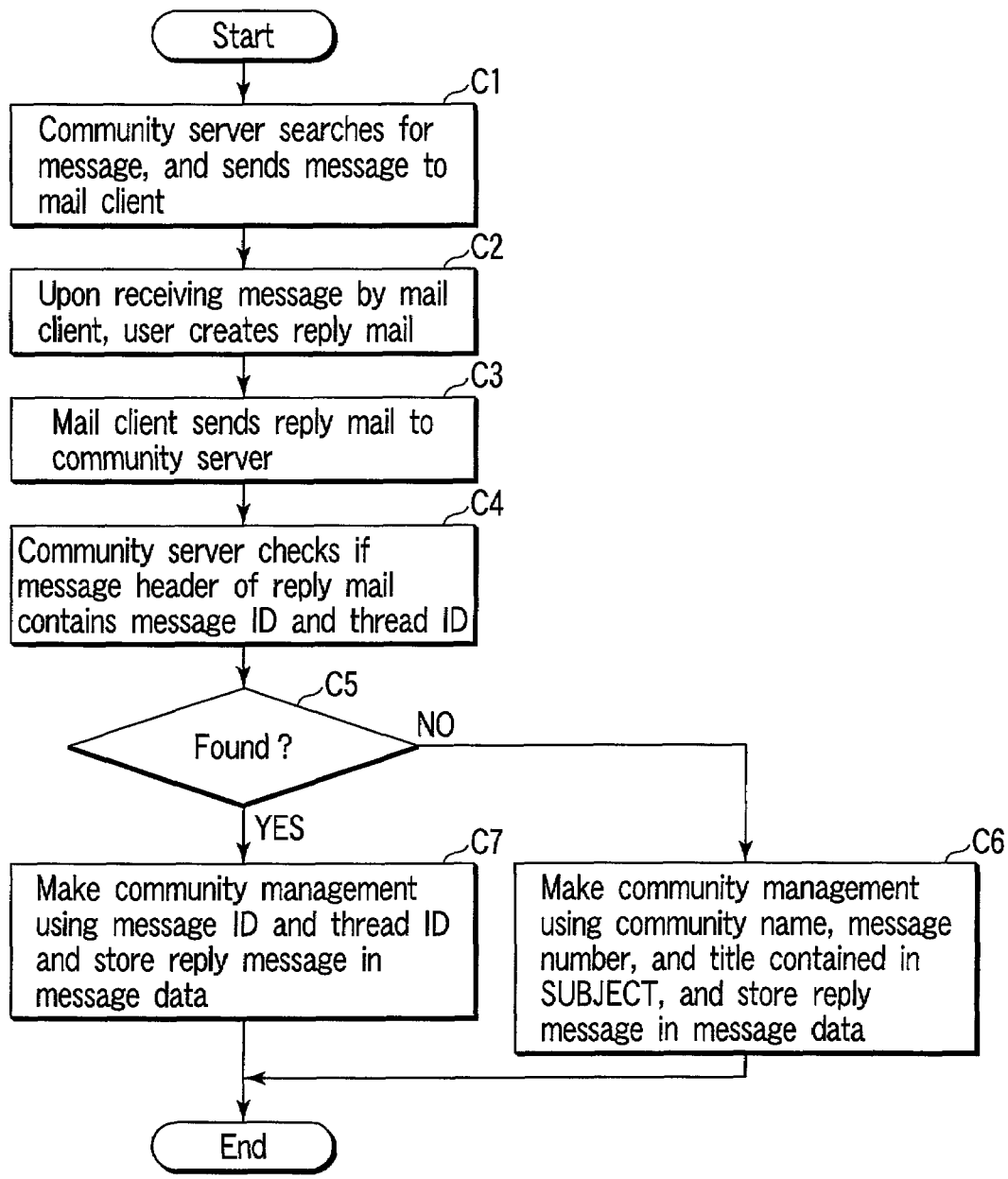
FIG. 23 is a flow chart showing the flow of a mail reply process in the community-based collaborative knowledge system of this embodiment.

FIG. 23 is a flow chart showing the reply mail processing methods shown in FIGS. 21 and 22.

The community server 122 finds a message and sends it to the mail client 112 (step C1). On the other hand, if the user of the mail client that received this message creates a reply mail message (step C2), the mail client 112 sends that reply mail to the community server 122 (step C3).

The reply mail processing unit 130 of the community server 122 checks if the message header of the reply mail message contains the message ID and thread ID (step C4). If the message ID and thread ID are not found (NO in step C5), the reply mail processing unit 130 makes community management using the community name, message number, and title contained in SUBJECT, and stores that message in the message data 125 (step C6), thus ending the process. On the other hand, if the message ID and thread ID are found (YES in step C5), the reply mail processing unit 130 makes community management using these message ID and thread ID, and stores that message in the message data 125 (step C7), thus ending the process.

In this manner, since the community-based collaborative knowledge system of this embodiment comprises the mechanism for analyzing SUBJECT in addition to the message header, it can cope with the mail client 112 which cannot recognize and drops the intentionally embedded control information, and can automatically and reliably store the reply mail in the corresponding location.

Since all the functions of the community-based collaborative knowledge system of this embodiment are implemented by computer programs, these computer programs are stored in a computer-readable storage medium, and are installed in a normal computer, which can be connected to a computer network, via the storage medium, thus obtaining the same effects as in this embodiment.

The present invention is not limited to the aforementioned embodiment, and various modifications may be made without departing from the scope of the invention when it is practiced. Furthermore, the embodiment includes inventions of various stages, and various inventions can be extracted by appropriately combining a plurality of required constituent elements disclosed in this application. For example, even when some required constituent elements are deleted from all the required constituent elements disclosed in the embodiment, an arrangement from which those required constituent elements are deleted can be extracted as an invention if the effect of the present invention is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A community-based collaborative system connected to a client terminal via a network and supports knowledge accumulation by categorizing and accumulating messages posted from the client terminal to a plurality of virtual communities, the plurality of virtual communities comprising at least a first virtual community and a second virtual community, the system comprising:

access control means for making user authentication of the client terminal so as to permit the client terminal to post a message;

message subscription type setting means for setting a first subscription type for the first virtual community, the first subscription type indicating a way a user subscribes to the messages categorized and accumulated in the plurality of virtual communities in accordance with an instruction from the user;

community processing means for managing the plurality virtual communities, and categorizing and accumulating messages posted, to the plurality of virtual communities, from the client terminal, the client terminal being granted access permission for specified topics by said access control means, said community processing means including:

reply message processing means for, when a reply email message used to post a reply message is received from the client terminal in response to an email message comprising a header that includes an ID, subject that includes a community name and an assigned number, and a message text of a new posting on a virtual community, determining whether or not a header of the reply email message includes the ID, categorizing and accumulating the reply message based on whether the header of the reply email message includes the ID, and delivering the categorized and accumulated reply message to a subscriber; and a processor for implementing at least the message subscription type setting means, wherein:

the ID comprises a message ID and a thread ID, and the reply message processing means categorizes and accumulates the reply message based on the message ID and the thread ID if it is determined that the header of the reply email message includes the message ID and the thread ID, and based on the community name and the assigned number included in a subject of the reply email message if it is determined that the header of the reply email message does not include the message ID and the thread ID.

2. The system according to claim 1, wherein the client terminal displays a window comprising a list of the first virtual community and the second virtual community, and wherein the displayed window indicates the first subscription type is browsing by a web browser for the first virtual community, and indicates a second subscription type is using an email client for the second virtual community, the second subscription type allowing the user to post the reply email message to the second virtual community by replying to a new posting.

3. The system according to claim 2, wherein said reply message processing means further automatically determines a topic to which the reply message should belong.

4. A reply message processing method in a community-based collaborative knowledge system connected to a client terminal via a network, and supports knowledge accumulation by categorizing and accumulating messages posted from the client terminal to a plurality of virtual communities, the plurality of virtual communities comprising at least a first virtual community and a second virtual community, comprising:

an access control step of making user authentication of the client terminal so as to permit the client terminal to post a message;

a message subscription type setting step of setting a first subscription type for the first virtual community, the first subscription type indicating a way a user subscribes to the messages categorized and accumulated in the plurality of virtual communities in accordance with an instruction from the user;

a community processing step of managing the plurality virtual communities, and categorizing and accumulating messages posted, to the plurality of virtual communities, from the client terminal, the client terminal being granted access permission for specified topics in the access control step, the community processing step including:

a reply message processing step of, when a reply email message used to post a reply message is received from the client terminal in response to an email message comprising a header that includes an ID, subject that includes a community name and an assigned number, and a message text of a new posting on a virtual community, determining whether or not a header of the reply email message includes the ID, categorizing and accumulating the reply message based on whether the header of the reply email message includes the ID, and delivering the categorized and accumulated reply message to a subscriber wherein:

the ID comprises a message ID and a thread ID, and the reply message processing step categorizes and accumulates based on the message ID and the thread ID if it is determined that the header of the reply email message includes the message ID and the thread ID, and based on the community name and the assigned number included in a subject of the reply email message if it is determined that the header of the reply email message does not include the message ID and the thread ID.

5. The method according to claim 4, wherein the client terminal displays a window comprising a list of the first virtual community and the second virtual community, and wherein the displayed window indicates the first subscription type is browsing by a web browser for the first virtual community, and indicates a second subscription type is using an email client for the second virtual community, the second subscription type allowing the user to post a reply email message to the second virtual community by replying to a new posting.

6. The method according to claim 5, wherein the reply message processing step includes further automatically determining a topic to which the reply message should belong.

* * * * *

UNITED STATES PATENT AND TRADEMARK OFFICE
CERTIFICATE OF CORRECTION

PATENT NO. : 7,539,763 B2  
APPLICATION NO. : 10/083151  
DATED : May 26, 2009  
INVENTOR(S) : Toyota et al.

Page 1 of 1

It is certified that error appears in the above-identified patent and that said Letters Patent is hereby corrected as shown below:

Claim 1, column 15, lines 55-56, change "plurality virtual" to --plurality of virtual--.

Claim 4, column 16, lines 49-50, change "plurality virtual" to --plurality of virtual--.

Claim 5, column 18, line 6, change "post a the" to --post the--.

Signed and Sealed this

Fourteenth Day of July, 2009

JOHN DOLL
*Acting Director of the United States Patent and Trademark Office*